United States Patent [19]

Holtz et al.

[11] 4,323,987
[45] Apr. 6, 1982

[54] POWER FAILURE MEMORY SUPPORT SYSTEM

[75] Inventors: Earl B. Holtz, Huntington; Roger F. Lay, Newtown; Flavio M. Manduley, Woodbury; Howard J. Moody, Monroe, all of Conn.

[73] Assignee: Pitney Bowes Inc., Stamford, Conn.

[21] Appl. No.: 134,738

[22] Filed: Mar. 28, 1980
(Under 37 CFR 1.47)

[51] Int. Cl.³ .............................................. G11C 11/40
[52] U.S. Cl. .................................... 365/229; 365/227; 371/10
[58] Field of Search .................. 365/229, 227; 371/10, 371/14, 66

[56] References Cited

U.S. PATENT DOCUMENTS 3,810,116  5/1974  Prohofsky ........................... 365/229
3,859,638  1/1975  Hume .................................. 365/229

OTHER PUBLICATIONS

IBM Tech. Dis. Bul., vol. 18, No. 12, May 1976, "Power Out Warning Interrupt Circuit", by R. D. DeMong, pp. 4147-4149.

Primary Examiner—Terrell W. Fears
Attorney, Agent, or Firm—Mark Levy; William D. Soltow, Jr.; Albert W. Scribner

[57] ABSTRACT

Apparatus for retrieving data from a volatile memory in a data processing system in the event of a power supply failure. Means are provided for transferring the data to an external device. Power sensing means detects a power failure; an independent power supply is provided for maintaining the data in the memory when the power sensing means detects a power failure; timing means detects a lapse of time from the power failure; and output means transfers the data from the volatile memory to the external device when the timing means indicates that a predetermined time interval has lapsed.

17 Claims, 5 Drawing Figures

POWER FAILURE MEMORY SUPPORT SYSTEM

BACKGROUND OF THE INVENTION

In recent years the historically minor expenses attributable to utilization of the mails have significantly increased as a result of both direct and indirect mailing costs. As these expenses continue to spiral upwardly, the mailing habits of major industries are coming under closer scrutiny with a view to controlling such expenses. In this connection, many major manufacturers of postage meters and systems, including the assignee of the present invention, have recently introduced lines of meterscale systems, which basically include a highly sensitive scale coupled to a postage meter which automatically prints the proper postage for franking the mailpieces weighed on the scale.

Other successful means have been devised for reducing indirect mailing costs. For example, the assignee of the present invention recently introduced a system for remotely resetting postage meters to eliminate the labor costs which would otherwise be incurred for hand-carrying postage meters to the local Post Office for resetting purposes.

With the above thoughts in mind, it should be appreciated that there is a need in the marketplace to provide suitable means for making a record of direct mailing costs on a current basis for cost analysis and other mail control purposes. In a typical office or corporate mailing room, a number of users have access to a single mailing machine and the postage meter associated therewith. In these situations, it is often desirable to account for the postage used by each person or department within the office. An automated system for providing this function is described in co-pending U.S. patent application, Ser. No. 108,061, filed Dec. 28, 1979, and assigned to the assignee of the present invention, the disclosure of which is hereby incorporated by reference.

In the apparatus of the above identified application, an encoder is shown for use with a postage meter. The encoder has a lever which is movable among a plurality of postage value selecting positions. The encoder includes framework adapted for removably mounting the encoder in operating relationship with respect to the postage meter, and includes means for monitoring movement of the postage meter setting lever on the meter when the encoder is mounted in the operating relationship. The monitoring means includes means for providing an electrical signal which varies in response to movement of the postage meter setting lever from one of the positions to another of the positions.

The encoder includes transducer assemblies which include a conventional variable linear potentiometer with a stationary linear resistance. As a postage meter setting lever is moved from one position to another, the resistance of the potentiometer varies, thus varying the value of the electrical signal.

The electrical signal generated by the potentiometer is converted by an analog to digital converter to a digital value. This value, as well as other data input by means of a keyboard to the accounting system, is stored in a volatile memory within the accounting system.

As with all electronic data processing systems using volatile memories, an interruption or irregularity in the power supply maintaining data in the volatile memory can cause the loss of data therein. Of course, this unfortunate phenomenon has been generally recognized ever since volatile memories have been used in data processing devices. Many attempts have been made to reduce or eliminate the possibility of loss of data during an interruption of power to the memory.

U.S. Pat. No. 4,145,761, issued to Gunter et al, discloses a volatile random access memory internal to a microprocessor powered by a stand-by voltage supply. The memory is used as a scratch pad. The voltage supply maintains data in the memory during power up and power down conditions. It is clear that the data will be maintained in the memory only as long as the stand-by voltage supply continues to supply power. Moreover, the data remains in the memory and is humanly unreadable in that form.

U.S. Pat. No. 3,859,638, issued to Hume, Jr., teaches the use of a stand-by power supply actuated upon main power supply failure. This system, similar to the invention disclosed above, has all of the limitations previously described.

U.S. Pat. No. 4,085,311, issued to Ohsako et al, discloses an integrated circuit counter and an auxiliary power source to maintain the data in the counter despite interruption of the main power supply. As in the previous systems, the data is maintained in this volatile memory during power down conditions. The limitations of dependency on an independent backup battery and human unreadability inherent in the inventions described above are likewise inherent in this invention.

U.S. Pat. No. 3,980,935, issued to Worst, discloses an elaborate power supply system comprising a main power supply, a secondary power supply, a power switch, and a battery back-up supply. The purpose of these power supplies is to maintain voltages to a volatile memory during termination of AC supply. The secondary power supply is used to sense failure of the main power supply to provide time for the backup battery to be connected to the volatile memory. Even with the additional complication of power supplies, however, the data is maintained in the volatile memory and the limitations of this invention are identical to the limitations decribed above.

Finally, U.S. Pat. No. 4,224,506, issued to Coppola et al., describes apparatus for preserving data that had been stored in a volatile memory during power down conditons. In this system, when a power interruption is detected, the system transfers data from the volatile memory to a non-volatile memory. Consequently, a loss of power does not adversely affect the integrity of the data originally stored in the volatile memory. The invention described in the above reference requires the use of an additional memory (i.e., a non-volatile memory). Moreover, the data transferred from the volatile memory to the non-volatile memory is not humanly readable.

SUMMARY OF THE INVENTION

The present invention provides apparatus for preserving data stored in a volatile memory in the event of an interruption of power to the memory. In addition, data is preserved for a predetermined time interval during which, if power is restored, the data is accessible for future processing. If power is not restored during this time interval, however, the data that had been stored in the volatile memory is output to an external device. A battery back-up system is provided to maintain the data in the volatile memory during the time interval hereinabove described.

In accordance with the present invention, there is provided in a data processing system including a volatile memory and a power supply for maintaining data in the memory, apparatus for retrieving data from the memory in the event of a power supply failure. Means are provided for transferring the data to an external device. Power sensing means detects a power failure; an independent power supply is provided for maintaining the data in the memory when the power sensing means detects a power failure; timing means detects a lapse of time from the power failure; and output means transfers the data from the volatile memory to the external device when the timing means indicates that a predetermined time interval has lapsed.

BRIEF DESCRIPTION OF THE DRAWINGS

As shown in the drawing wherein like reference numerals designate like or corresponding parts throughout the several figures.

DETAILED DESCRIPTION OF THE PREFERRED EMBODIMENT

Figure 1:
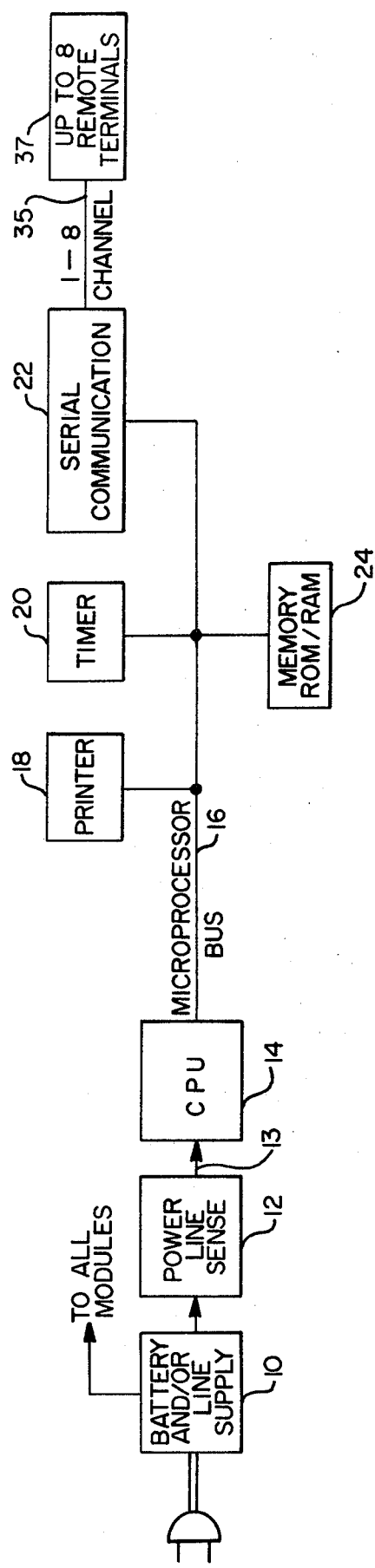
FIG. 1 is block diagram of the data processing system.

Referring now to FIG. 1 a power supply 10 including two backup batteries, not shown, is connected to power line sense circuitry 12 which is comprised of opto-isolators, not shown. The power supply 10 is also connected to all other modules as hereinbelow identified in the system. The power line sensing circuitry 12 is connected over a line 13 to a central processing unit (CPU) such as Model 8085 manufactured by Intel Corporation and referred to as reference numeral 14.

A microprocessor bus 16 connects the CPU 14 to the following modules: a printer system 18 for use with the Model No. 410 printer manufactured by LRC Corporation; a timer 20; serial communications channels 22; and memory 24 comprising read only memory (ROM) and random access memory (RAM).

Serial communications channels 22 can be connected to up to eight remote terminals 37 over a 1-8 communications channel bus 35. Each of these remote terminals 37 may include one or more separate, independently operated postage meter systems. These systems include in part a postage meter and an encoder as described in the aforementioned co-pending patent application.

Refering now also to FIG. 1, the power supply shown by reference numeral 10 comprises two backup batteries shown generally as reference numeral 26. The power supply 10 also contains a line power supply 28 connected directly to a source of AC power, not shown. Battery chargers 27 are connected between the backup batteries 26 and the line power supply 28. Both the backup batteries 26 and the line power supply 28 are connected to an arbitration circuit 30 which connects all modules either to the line power supply 28 or to the backup batteries 26, depending on whether AC line power is present. The power line sense circuitry 12 is connected to the line power supply 28 in the power supply 10.

Figure 2:
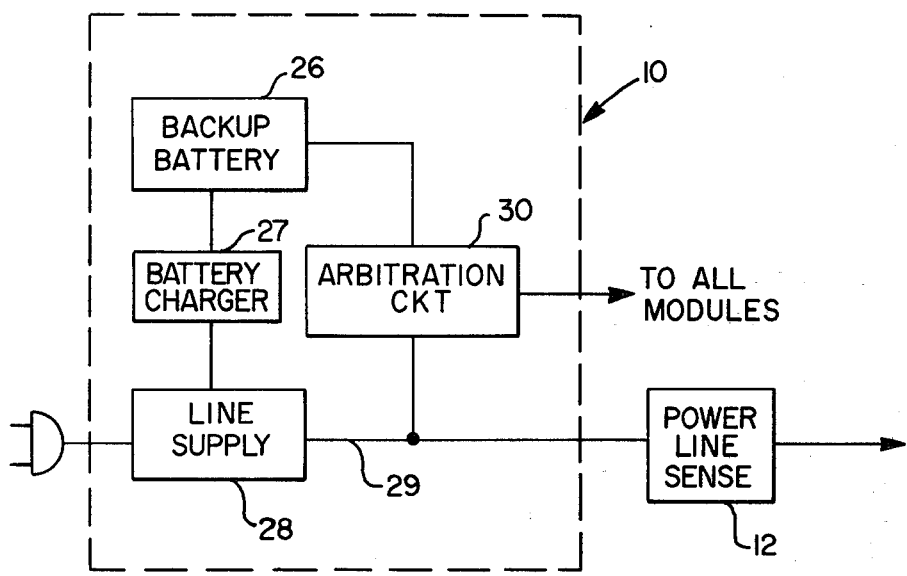
FIG. 2 is a block diagram of the power supply.
Figure 3:
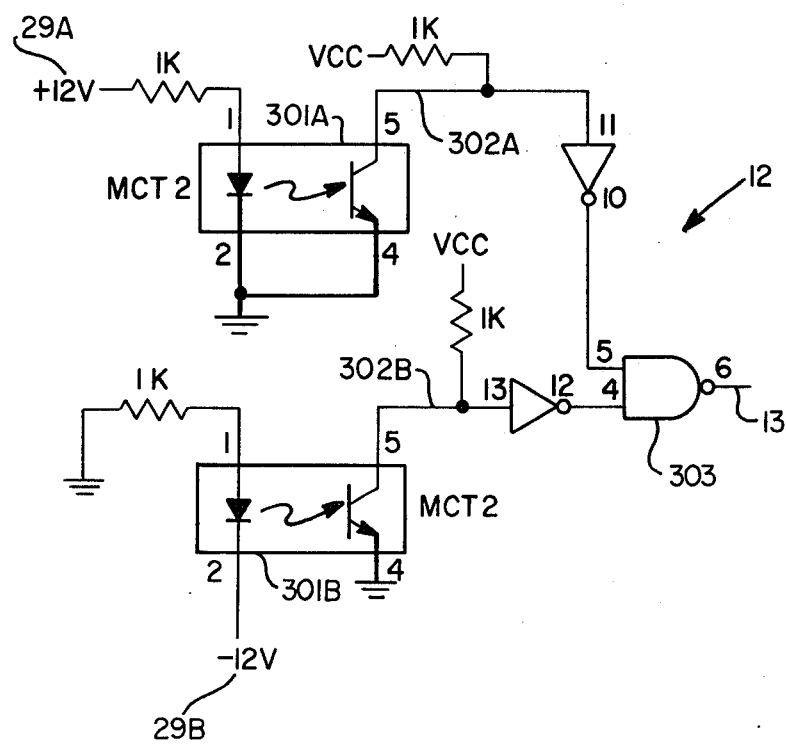
FIG. 3 is an electrical schematic diagram of the power line sensing circuit.

Referring now to FIG. 3, the components incorporated in the power line sensing circuitry 12 are shown. Two outputs from the line supply 18 (FIG. 2) are shown as reference numerals 29A and 29B in FIG. 3. Both outputs are commonly referred to in FIG. 1 as reference numeral 29. The power from each output 29A and 29B is sensed by opto-isolators 301A and 301B, respectively. The output signals 302A and 302B from each opto-isolator 301A and 301B, respectively, are logically, "ANDed" by gate 303 to provide a power fail signal over line 13.

Figure 4:
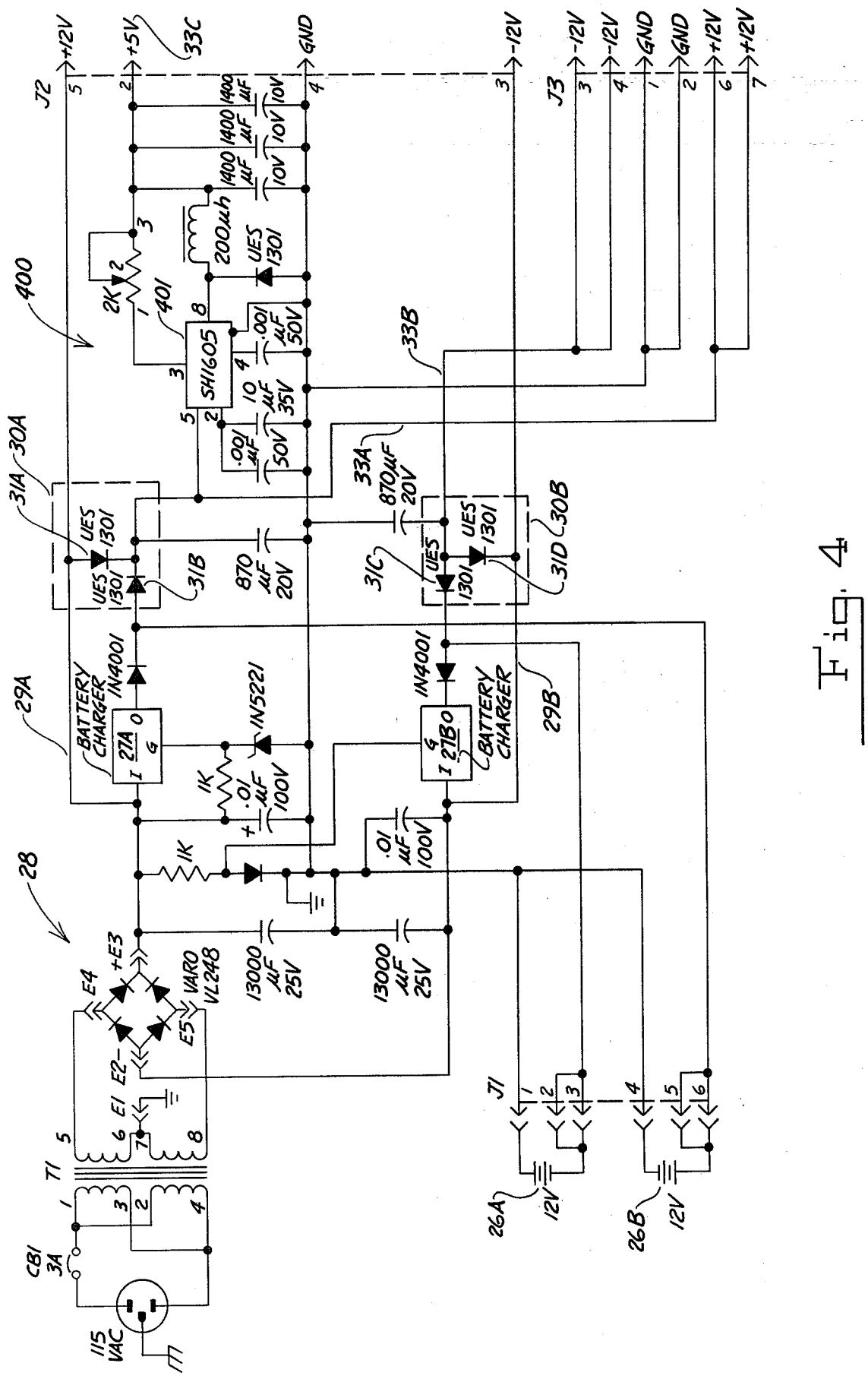
FIG. 4 is an electrical schematic diagram of the power supply circuit.

Referring now also to FIG. 4, the power supply 10, including the batteries 26A and 26B, line power supply 38 and arbitration circuit 30, are shown. The batteries 26A and 26B are commonly referred to as reference numeral 26 in FIG. 2.

Two battery chargers 27A and 27B are used to charge the batteries 26A and 26B respectively when AC power is supplied over the line power supply 28. Both battery chargers 27A and 27B are commonly referred to as reference numeral 27 in FIG. 2.

AC power is normally supplied to the line power supply 28 from an external source. The line power supply 28 is connected by lines 29A and 29B to two arbitration circuits 30A and 30B which consist of two separate sets of two diodes in each set, shown as reference numerals 31A, 31B, 31C, and 31D. These diodes are used to logically "OR" the lines 29A and 29B and the corresponding batteries 26A and 26B to provide power lines 33A, 33B and 33C to supply energy to power the other modules in the system. Power line 33A also supplies power to a switching regulator power supply 400 which includes a switching regulator IC chip 401 such as the Model SH1605 switching regulator supplied by Fairchild Corp., the putput of which is the power line referred to as reference numeral 33C.

The switching regulator power supply 400 is used to provide an efficient means of generating 5 volts from either the AC power or battery supply 26. Also, when power is being supplied by batteries 26, the duty cycle of the switching regulator power supply 400 allows power to be drawn from the battery 26 in pulses, thus extending the useful charge time of the battery 26.

Figure 5:
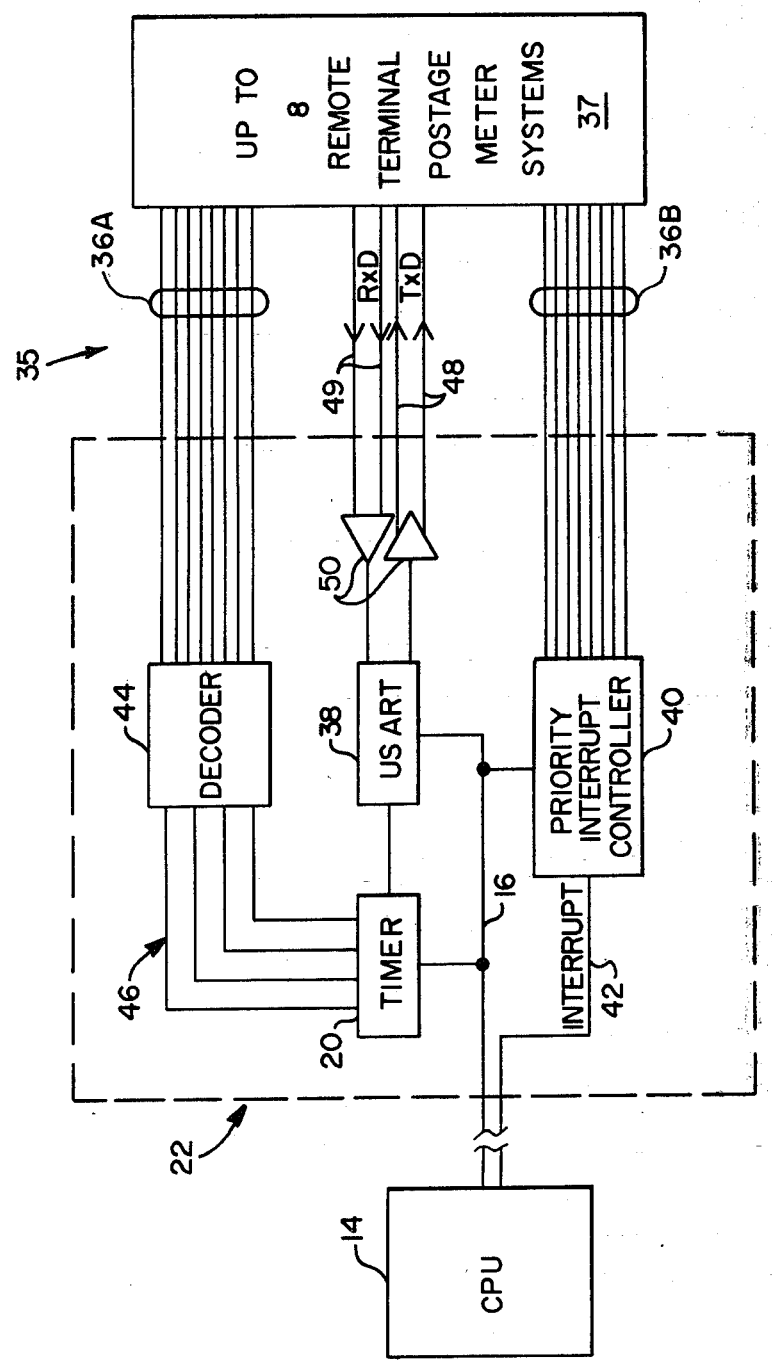
FIG. 5 is an electrical schematic diagram of the microprocessor bus circuit.

Reference should now be made to FIG. 5, which shows the serial communications channel 22. The timer, shown as reference numeral 20, actually serves two functions and appears separately in FIG. 1 and FIG. 5 to indicate its different functional relationship to the modules.

The CPU 14 is connected by means of the microprocessor bus 16 to the timer 20, and to a universal synchronous/asynchronous receiver/transmitter (USART), such as Model No. 8251 manufactured by Intel Corporation, and to a priority interrupt controller 40, such as Model No. 8259 manufactured by the Intel Corporation. An interrupt line 42 also connects the CPU 14 to the priority interrupt controller 40. The interrupt controller 40 is under software control and priority is determined on a rotating basis. A decoder 44, such as Model No. 74LS42 manufactured by National Semiconductor Corporation, is connected over four I/O lines 46 to the timer 20.

The 1-8 communcations channel bus 35, as shown in FIG. 1 and FIG. 5 can include up to 20 lines, excluding ground reference lines, not shown. These 20 lines consist of: up to eight I/O lines referred to as reference numeral 36A; four data lines 48 and 49; and up to eight I/O lines 36B. The phrase "I/O channel" as hereinafter used is defined as one 36A line, two 48 lines, two 49 lines and one 36B line.

Eight individual I/O lines referred to as numeral 36B are sent to the priority interrupt controller 40 as request to send (RTS) lines. Similarly, the I/O lines from the decoder 44 are sent to the eight I/O lines 36A individually as clear to send (CTS) lines. Each one of I/O lines 36A and each one of I/O lines 36B is connected to only one of the eight remote terminals 37.

There are two sets of data lines 48 and 49 to provide a party line capability. These data lines 48 and 49 are commonly connected to all terminals 37. That is, lines 49 are connected to all eight terminals 37 to receive data therefrom and line 48 are connected to all eight terminals 37 to transmit data thereto. Buffers 50 are provided between the lines 48 and 49 and the USART 38.

In operation, in the event of a line power failure, the power line sensing circuitry 12 signals the CPU 14 that such a condition is present. The CPU 14 then signals the timer 20 over the microprocessor bus 16 to begin a timing measurement operation. If power is reinstated to the system over the line power supply 28 within an arbitrary length of time (e.g., 30 minutes), then the power down routine is halted. The timer 20 is reinitialized at that point. The arbitration circuit 30 then connects the line power supply 28 to the modules over lines 33A, 33B and 33C and disconnects the batteries 26A and 26B.

After the 30 minute time interval has elapsed, the timer 20 times out and sends a signal over the microprocessor bus 16 to the CPU 14 apprising the CPU 14 of that fact. The CPU 14 then performs a data dump of all the data in the RAM portion of the memory 24. This data is transferred over the microprocessor bus 16 to an external device. The external device may be either a printer 18 or another peripheral device connected to the microprocessor bus 16 directly in place of, or in addition to the printer 18. The RAM data may be dumped to one of eight external devices shown generally as reference numeral 37, and connected to the serial communications channel 22, over one of eight channels shown generally at 35.

One of the remote terminals 37 generates a request to send (RTS) signal to the priority interrupt controller 40, which controller interrupts processing of the CPU 14 over interrupt line 42. The CPU 14, now apprised of a request by a remote terminal, sends a signal over the microprocessor bus 16 through the timer 20 over lines 46 to the decoder 44, which decoder 44 then transmits a clear to send (CTS) signal to the proper remote terminal 37.

This communications link ties the main terminal, which houses the CPU 14, to the remote terminals 37 over lines 35. The remote terminals 37 transfer commands and data over the receive data line 49 through the buffer 50 to the USART 38 which in turn relays this data over the microprocessor bus 16 to the CPU 14.

The priority interrupt controller 40 determines the identity of the remote terminal 37 that has requested the communications channel. The CPU 14 can respond to the requesting terminal's signal over the microprocessor bus 16 through the USART 38, the corresponding buffer 50 and over the transmit data lines 48. In this way, one USART 38 can be used to communicate with any one of eight individual remote terminals 37 as identified by the priority interrupt controller 40 and further identified by the decoder 44.

Once the CPU 14 has completed the request to the individual remote terminal 37, the communication line 36A from the decoder 44, which generates clear to send (CTS) signals, is disconnected. The specified remote terminal 37 then disconnects its associated 36B line, thereby freeing its channnnel. The remote terminal 37 is then disengaged to allow another remote terminal 37 to request service over one of the request to send (RTS) lines 36B connected to the priority interrupt controller 40. At this point the process can be repeated.

It can be seen from the above disclosure that a novel apparatus has been provided for retaining data stored in a volatile memory of a data processing system during power down situations.

It should be understood that the term postage meter is used herein to refer to the general category of devices for imprinting a defined unit value for governmental or private carrier delivery of envelope or parcels, or other like application for unit value printing. Thus, the term is used as a general term for devices utilized in conjunction with services other than those exclusively employed by governmental postal services. The term encompasses, for example, private parcel or freight service meters.

Inasmuch as certain changes may be made in the above described invention without departing from the spirit and scope of the same, it is intended that all matter contained in the above description or shown in the accompanying drawings shall be interpreted in an illustrative rather than limiting sense. Moreover, it is intended that the following claims be interpreted to cover all the generic and specific features of the invention herein described.

What is claimed is:

1. A data processing system comprising:
    (a) volatile memory for storing data, said volatile memory having a given time within which data therein must be refreshed;
    (b) first power supply for maintaining said data in said volatile memory;
    (c) power sensing means for detecting a power failure of said first power supply;
    (d) a second power supply for independently supplying power when said power sensing means detects a power failure of said first power supply;
    (e) timing means operatively connected to said power sensing means for detecting a lapse of time from said power failure; and
    (f) delay ouput means coupled to said volatile memory and connected to be operated by said second power supply for transferring said data from said volatile memory to an external device when said timing means indicates that a predetermined time interval has elapsed, said predetermined time interval being substantially greater than said time within which data in said volatile memory must be refreshed.

2. The apparatus in accordance with claim 1 wherein said predetermined time interval is at least 30 minutes.

3. The apparatus in accordance with claim 1 wherein said external device is adapted to display said data in human readable form.

4. The apparatus in accordance with claim 3 wherein said external device is a printer.

5. The apparatus in accordance with claim 1 wherein said independent power supply is a back-up battery.

6. The apparatus in accordance with claim 5 wherein said back-up battery further comprises a second backup battery and switching means for providing alternative power by each of said back-up batteries.

7. The apparatus in accordance with claim 5 wherein power is drawn from said back-up battery in pulses to extend the useful charge of said back-up battery.

8. The apparatus in accordance with claim 1 wherein said first power supply is energized by a source of AC operating potential.

9. The apparatus in accordance with claim 8 wherein said second power supply is energized by a source of DC operating potential.

10. The apparatus in accordance with claim 1 wherein said output means is a printer connected to be operated by said first power supply and when a power failure in said first source of supply is detected by said second source of supply.

11. The apparatus in accordance with claim 9 wherein said DC operating potential is a battery.

12. In a postage meter accounting system for recording metered postage amounts chargeable to individual accounts, a system comprising:
  (a) a plurality of remote terminals, each terminal having at least one postage meter and postage encoding means operatively connected thereto;
  (b) a plurality of communications channels, each channel of said plurality of communications channels connected to one of said plurality of remote terminals;
  (c) a central processing unit coupled to said plurality of communications channels;
  (d) a volatile memory coupled to said central processing unit for storing data relating to metered postage amounts chargeable to individual accounts from said remote terminals over said plurality of communications channels;
  (e) a first power supply for maintaining said data in said volatile memory;
  (f) a power sensing means for detecting a power failure of said first power supply.
  (g) a second power supply for independently supplying power when said power sensing means detects a power failure of said first power supply; and
  (h) printing means coupled to said volatile memory and connected to be operated by said second power supply for printing said data from said volatile memory.

13. The system in accordance with claim 12 further comprising:
  (i) timing means operatively connected to said power sensing means for detecting a lapse of time from said power failure.

14. The system in accordance with claim 13 wherein said printing means is energized by a backup battery.

15. The system in accordance with claim 13 or 14 wherein said printing means is energized for printing said data from said volatile memory by said backup battery when said timing means indicates that a predetermined time interval has elapsed.

16. The apparatus in accordance with claim 1 wherein said timing means is reinitialized if power is restored to said first power supply before said predetermined time interval has elapsed.

17. The system in accordance with claim 13 wherein said timing means is reinitialized if power is restored to said first power supply before a predetermined time interval has elapsed from said power failure.

* * * * *

UNITED STATES PATENT AND TRADEMARK OFFICE
CERTIFICATE OF CORRECTION

PATENT NO. : 4,323,987
DATED : April 6, 1982
INVENTOR(S) : Earl B. Holtz, Roger F. Lay, Flavio M. Manduley, Howard J. Moody It is certified that error appears in the above-identified patent and that said Letters Patent are hereby corrected as shown below:

Column 3, line 55: "Fig. 1" should be --Fig. 2--.

Column 4, line 3: "18" should be --28--.

Column 4, line 5: "Fig. 1" should be --Fig. 2--.

Column 4, line 14: "38" should be --28--.

Signed and Sealed this

First Day of March 1983

[SEAL]

Attest:

GERALD J. MOSSINGHOFF

Attesting Officer     Commissioner of Patents and Trademarks